W. M. FOLBERTH.
WINDSHIELD CLEANER.
APPLICATION FILED FEB. 12, 1920.
1,365,391.
Patented Jan. 11, 1921.
2 SHEETS—SHEET 1.
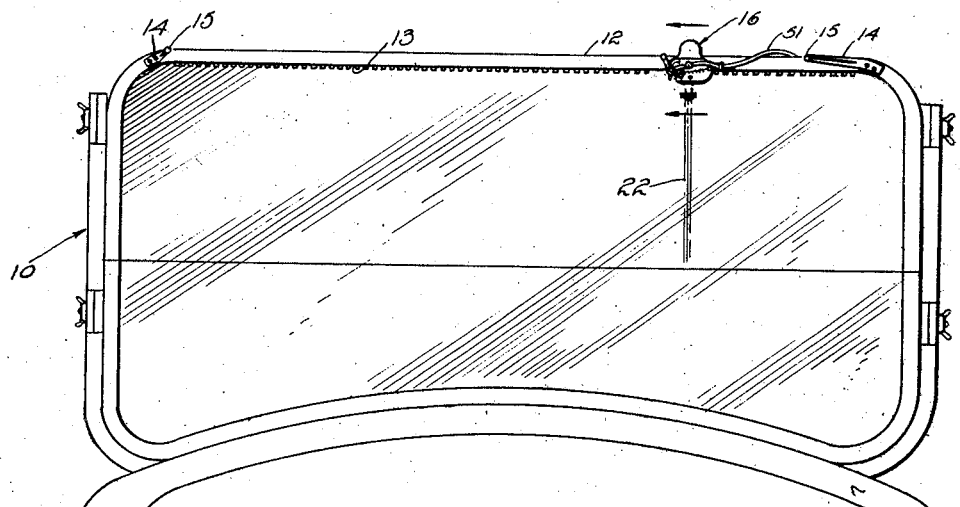
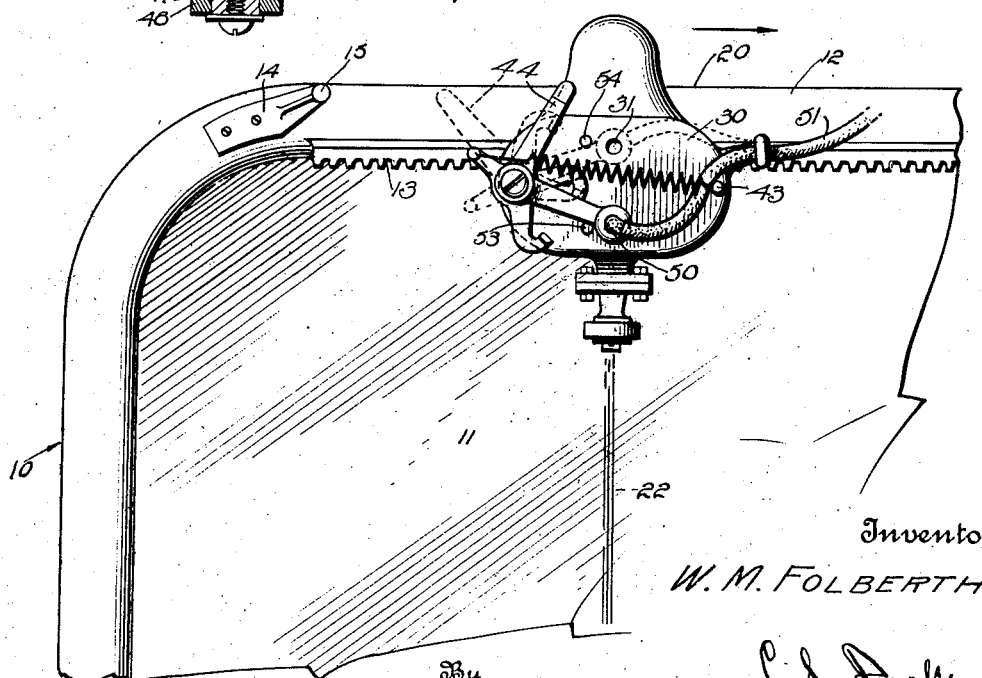
Inventor
W. M. FOLBERTH,
By
Attorney

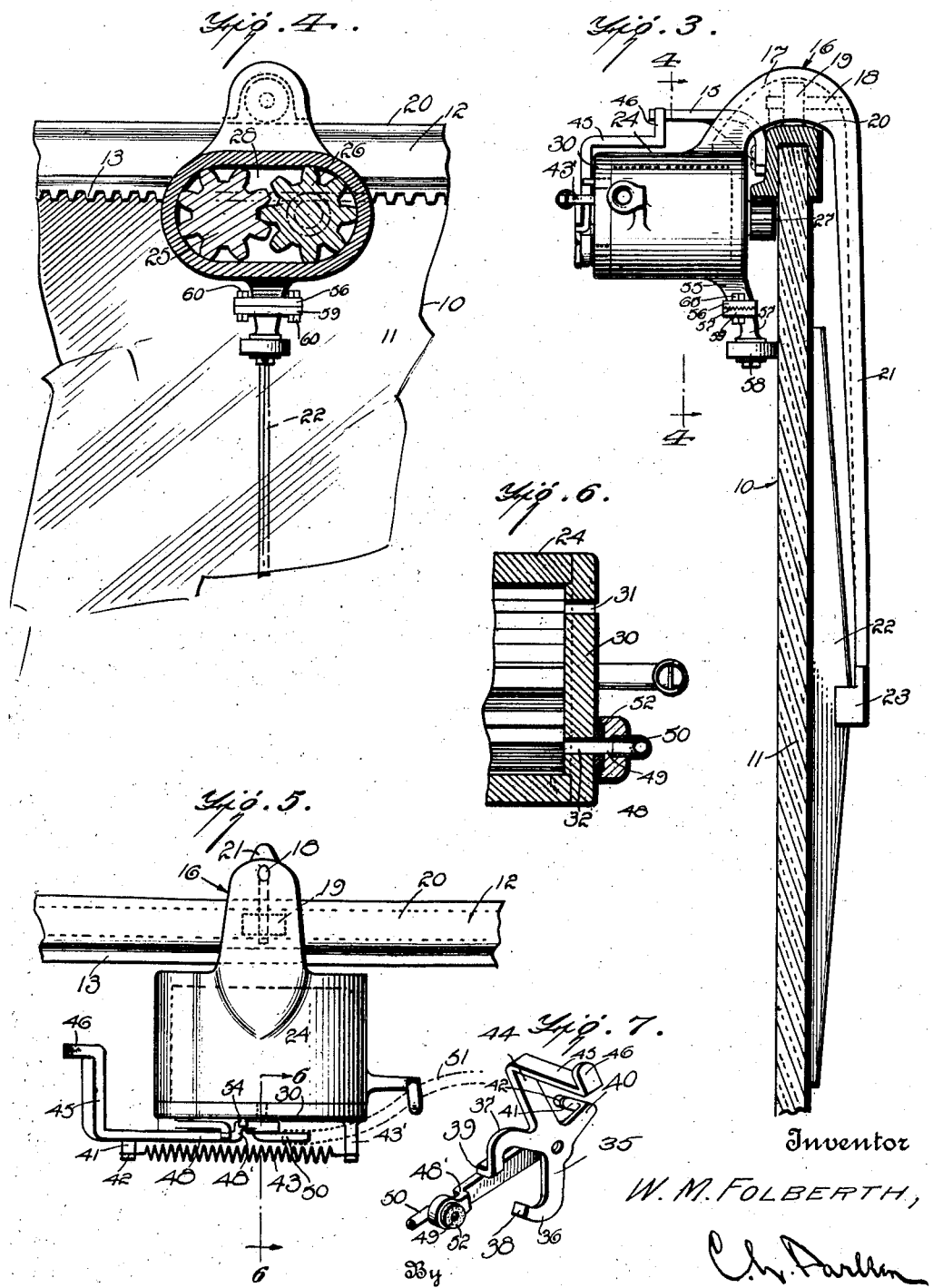

UNITED STATES PATENT OFFICE.

WILLIAM M. FOLBERTH, OF CLEVELAND, OHIO.

WINDSHIELD-CLEANER.

1,365,391. Specification of Letters Patent. Patented Jan. 11, 1921.

Application filed February 12, 1920. Serial No. 358,200.

*To all whom it may concern:*

Be it known that I, WILLIAM M. FOLBERTH, a citizen of the United States, residing at Cleveland, in the county of Cuyahoga and State of Ohio, have invented certain new and useful Improvements in Windshield-Cleaners, of which the following is a specification.

This invention relates to improvements in wind shield cleaners.

An important object of the invention is to provide a windshield cleaner which is automatically operated and which will clean the entire surface of the windshield or a major portion thereof.

A further object is to provide means whereby the tension of the cleaning element upon the glass of the windshield may be regulated.

Other objects and advantages will be apparent throughout the course of the following discussion.

In the accompanying drawings wherein for the purpose of illustration is shown a preferred embodiment of my invention and wherein like numerals designate like parts throughout.

Figure 1 is a front elevation of a windshield having my cleaner applied thereto.

Fig. 2 is an enlarged fragmentary front elevation thereof.

Fig. 3 is an enlarged side elevation of my device.

Fig. 4 is a section taken on the line 4—4 of Fig. 3.

Fig. 5 is a top plan view of my apparatus.

Fig. 6 is a section taken on the line 6—6 of Fig. 5.

Fig. 7 is a combined perspective of the valve and operating mechanism therefor detached, and Fig. 8 is an enlarged section showing the method of attaching the valve and operating mechanism.

Referring now more particularly to the drawings the numeral 10 indicates a windshield as a whole comprising the usual transparent element 11 and binding frame work 12. The upper portion of the binding frame work 12 has formed thereon or secured thereto a rack 13 and stop members 14 having angularly extending arms 15 projecting outwardly from the windshield. The purpose of the rack and stop members hereinafter appear.

Mounted upon the windshield 10 is the member 16 comprising a central section 17 within which is journaled a shaft 18. Rotatably mounted upon the shaft 18 is a roller 19 which engages the upper surface 20 of the upper portion of the frame work 12. Depending from the portion 17 upon one side of the windshield is a member 21 provided upon its lower end with a cleaning member 22 and a holder therefor 23, the parts 22 and 23 being shown as similar to those described and claimed in my copending application, Serial Number 325,873 filed September 24th 1919.

Upon the opposite side of the windshield the member 17 is also provided with a depending portion having formed thereon or secured thereto a cylinder 24. This cylinder has mounted therein rotors 25 and 26, the cylinder being so shaped that the rotors form spaces 28 and 29. One of the rotors 26 is provided with a shaft extending without the cylinder and provided with a gear 27 meshing with the rack 13. It will be seen that if the rotor 26 is rotated in either direction the cylinder and the portions attached thereto including the cleaning element 22 will be caused to travel longitudinally of the windshield.

A cover plate 30 is provided for the cylinder 24 having openings 31 and 32 formed therein connecting with the spaces 28 and 29 respectively. Formed upon or secured to the upper surface of the plate 30 at a point lying at approximately the central axis of the plate and adjacent one end thereof is a pin 33. This pin is reduced as at 34 and has rotatably mounted thereon a member 35.

This member 35 is provided with spaced arms 36 and 37 having upstanding portions 38 and 39 respectively. The member 35 is also provided with an arm 40 extending outwardly from the pivot point in a direction opposite to that of the arms 36 and 37. This arm 40 is provided with an upstanding portion 41 having formed therein a groove 42 adapted to receive one end of the coiled spring 43. The opposite end of the spring 43 is secured to a pin 43' mounted upon the opposite end of the cover plate 30. A still further arm 44 is formed upon the member 35 having an angular extension 45 carrying a contact member 46 adapted to engage the outstanding arms 15 of the stop members 14.

The pin 33 has a further reduced portion 47 upon which is mounted a valve arm 48 having its free end offset as at 48'. Through the free end of the valve arm 48 is formed an aperture 49 which communicates with a connecting member 50. This connecting member 50 communicates with the conduit 51 which is in turn connected with a suitable source of suction supply (not shown). The under face of the arm 48 is provided with a gasket 52 surrounding the opening 49 thereof. Pins 53 and 54 are provided to limit the movement of a valve arm 48.

Projecting downwardly from the lower end of the cylinder 24 is a member 55 having its lower face serrated and provided with flanges 56. A roller bearing member 57 is provided having a roller 58 which is adapted to contact the glass of the windshield upon the opposite side from the cleaning element 22. The upper end of the member 57 is provided with serrations 57' adapted to coact with the serrations of the member 55 and is provided with flanges 59. Through the flanges 59 and 56 extend suitable securing members 60.

It will be obvious that by loosening the securing member the roller 58 may be adjusted to and from the glass 11 of the windshield thereby adjusting the pressure with which the cleaning element 22 engages the opposite side of the glass.

The operation of my device is as follows:

Assuming the valve arm 48 be in position shown in Fig. 1, suction being applied at the opening 31 the incoming air through the opening 32 causes the rotor 26 to rotate in a clockwise direction and the cleaning device accordingly moves to the left as indicated by the arrow on Fig. 1. Arriving adjacent the left hand end of the rack 13 extension 46 of the arm 44 engages the stop member 14 and the member 35 is shifted upon its pivot. As soon as the member 41 passes across a line drawn from the member 43' through the pivot pin 33 the spring 43 comes into action and snaps the member 35 around causing the upstanding portion 38 of the arm 36 to engage the valve arm 48 and force the valve to the position shown in Fig. 2. As suction is now applied at the opposite side of the rotors the rotor 26 now rotates in a counter clockwise direction and the member 16 is accordingly moved to the right. Arriving at the right hand end of the rack the levers of the operation previously described takes place and the member 16 again moves toward the left.

As many changes are possible in the shape, size and arrangement of the various parts herein shown I do not limit myself to the specific structure herein set forth but may make any such changes without departing from the spirit of the invention or the scope of the subjoined claims.

What I claim is:

1. In a motor for windshield cleaners, a member mounted to reciprocate upon the windshield frame, a cylinder secured thereto, a rotor mounted within said cylinder, a conduit having communication with a suitable source of suction, and means actuated by the reciprocation of said reciprocating member to place said conduit alternately in communication with opposite sides of said rotor, the side of the rotor not in communication with said conduit being open to the atmosphere.

2. In a motor for windshield cleaners, a member mounted to reciprocate upon the windshield frame, a cylinder secured thereto, a rotor mounted within said cylinder, said rotor being provided with a shaft, a gear secured to said shaft, a rack secured to the frame of the windshield and meshing with said gear, a conduit having communication with a suitable source of suction and means actuated by the movement of said reciprocating member to place said conduit alternately in communication with opposite sides of said rotor, the side of the rotor not in communication with said conduit being open to the atmosphere.

3. In a motor for windshield cleaners, a member mounted to reciprocate upon the windshield frame, a cylinder secured thereto, said cylinder being provided with openings, a rotor mounted within said cylinder, said rotor being provided with a shaft, a gear secured to said shaft, a rack secured to the frame of the windshield and meshing with said gear, a valve arm pivoted on said cylinder and provided in its free end with an opening, a conduit connected with the opening in said valve arm and having communication with a suitable source of suction, and means actuated by the movement of said reciprocating member to place the opening in said valve arm alternately in communication with the openings in said cylinder, said openings being disposed on opposite sides of said rotor, the opening in the cylinder not in communication with the opening in said valve arm being open to the atmosphere.

4. In a motor for windshield cleaners, a member mounted to reciprocate upon the windshield frame, a cylinder secured thereto, said cylinder being provided with openings, a rotor mounted within said cylinder, said rotor being provided with a shaft, a gear secured to said shaft, a rack secured to the frame of the windshield and meshing with said gear, a valve arm pivoted on said cylinder and provided in its free end with an opening, a valve arm shifting member pivoted on said cylinder, said member embodying spaced arms having portions adapted to shift said valve arm, a conduit connected with the opening in said valve arm and having communication with a suitable source of suction, and means connected with the windshield for actuating said valve shifting member to place the opening in said valve arm alternately in communication with the openings in said cylinder, said openings, being disposed on opposite sides of said rotor, the opening in the cylinder not in communication with the opening in said valve arm being open to the atmosphere.

5. In a motor for windshield cleaners, a member mounted to reciprocate upon the windshield frame, a cylinder secured thereto, said cylinder being provided with openings, a rotor mounted within said cylinder, said rotor being provided with a shaft, a gear secured to said shaft, a rack secured to the frame of the windshield and meshing with said gear, a valve arm pivoted on said cylinder and provided in its free end with an opening, a conduit connected with the opening in said valve arm and having communication with a suitable source of suction, a valve arm shifting member pivoted on said cylinder, said member embodying spaced arms having portions adapted to shift said valve arm, an arm secured to said valve arm shifting member, and stops secured to said windshield frame arranged in the path of and adapted to contact said last named arm for actuating said valve shifting member to place the opening in said valve arm alternately in communication with the openings in said cylinder, said openings being disposed on opposite sides of said rotor, the opening in the cylinder not in communication with the opening in said valve arm being open to the atmosphere.

In testimony whereof I affix my signature in presence of two witnesses.

WILLIAM M. FOLBERTH.

Witnesses:
 ERVIN HENRY EHLERT,
 MAXWELL FORD FOURNIER.